(12) United States Patent
Murakami (10) Patent No.: US 11,025,792 B2
(45) Date of Patent: Jun. 1, 2021

(54) IMAGE PROCESSING APPARATUS AND NON-TRANSITORY COMPUTER READABLE MEDIUM FOR DOCUMENT PROCESSING

(71) Applicant: FUJI XEROX CO., LTD., Tokyo (JP)

(72) Inventor: Takashi Murakami, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 197 days.

(21) Appl. No.: 15/937,869

(22) Filed: Mar. 28, 2018

(65) Prior Publication Data
US 2018/0295249 A1      Oct. 11, 2018

(30) Foreign Application Priority Data

Apr. 7, 2017   (JP) .............................. JP2017-076708

(51) Int. Cl.
*H04N 1/00*  (2006.01)
*G06K 9/00*  (2006.01)

(52) U.S. Cl.
CPC ..... *H04N 1/00801* (2013.01); *G06K 9/00288* (2013.01); *G06K 9/00442* (2013.01)

(58) Field of Classification Search
None
See application file for complete search history.

(56) References Cited

U.S. PATENT DOCUMENTS

| | | | |
|---|---|---|---|
| 2015/0294100 A1* | 10/2015 | King | G06K 9/036 726/19 |
| 2015/0341370 A1* | 11/2015 | Khan | H04L 63/0861 726/30 |

FOREIGN PATENT DOCUMENTS

| | | | |
|---|---|---|---|
| JP | 2015070448 | | 4/2015 |
| JP | 2015070448 A | * | 4/2015 |
| JP | 2016-139979 | | 8/2016 |

OTHER PUBLICATIONS

"Office Action of Japan Counterpart Application", dated Sep. 8, 2020, with English translation thereof, pp. 1-9.
"Office Action of Japan Counterpart Application", dated Jan. 5, 2021, with English translation thereof, pp. 1-5.

* cited by examiner

*Primary Examiner* — Andrew H Lam
(74) *Attorney, Agent, or Firm* — JCIPRNET (57) ABSTRACT

An image processing apparatus includes a camera, an image reading unit, and a controller. The camera is configured to capture an image of a face of a person. The image reading unit is configured to read a document and to output a document image. The controller is configured to perform control to permit certain processing on the document image if the image of the face captured by the camera matches a face image extracted from the document image.

7 Claims, 7 Drawing Sheets

| DOCUMENT TYPE | PERSONAL INFORMATION ITEM | DESCRIPTION AREA | DESCRIPTION FORMAT |
|---|---|---|---|
| DRIVER'S LICENSE | LICENSE NUMBER | (x1,y1),(x2,y2) | %d{12} |
| | BIRTHDAY | (x3,y3),(x4,y4) | %d{2}-%d{2}-%d{2} |
| | .... | .... | .... |
| .... | .... | .... | .... |

IMAGE PROCESSING APPARATUS AND NON-TRANSITORY COMPUTER READABLE MEDIUM FOR DOCUMENT PROCESSING

CROSS-REFERENCE TO RELATED APPLICATIONS

This application is based on and claims priority under 35 USC 119 from Japanese Patent Application No. 2017-076708 filed Apr. 7, 2017.

BACKGROUND

(i) Technical Field

The present invention relates to an image processing apparatus and a non-transitory computer readable medium.

(ii) Related Art

Among apparatuses that execute information processing on a scanned document, there are apparatuses that, in order to prevent unauthorized use or the like of a document including personal information, prohibit execution of information processing if the scanned document image includes personal information. Meanwhile, it is inconvenient to uniformly prohibit processing of documents including personal information; thus, there are apparatuses that allow processing of such documents in certain cases.

In the case of a system that asks a server whether to permit processing of a document including personal information, it is necessary to register in the server whether to permit such processing according to each user.

SUMMARY

According to an aspect of the invention, there is provided an image processing apparatus including a camera, an image reading unit, and a controller. The camera is configured to capture an image of a face of a person. The image reading unit is configured to read a document and to output a document image. The controller is configured to perform control to permit certain processing on the document image if the image of the face captured by the camera matches a face image extracted from the document image.

BRIEF DESCRIPTION OF THE DRAWINGS

An exemplary embodiment of the present invention will be described in detail based on the following figures, wherein.

DETAILED DESCRIPTION

Figure 1:
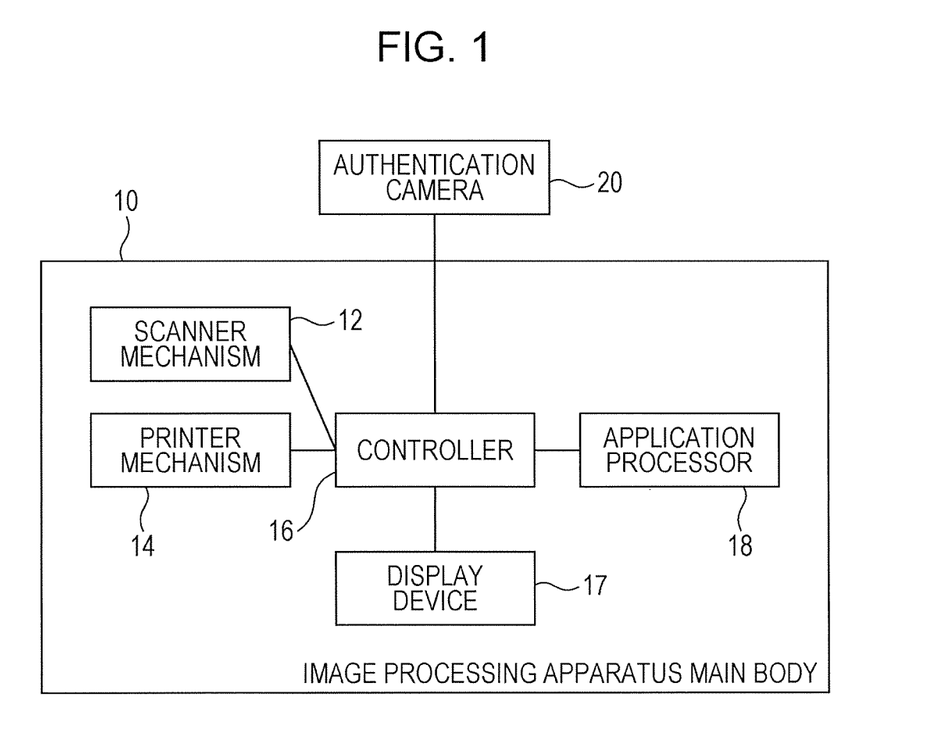
FIG. 1 is a diagram illustrating an exemplary configuration of an image forming apparatus.

FIG. 1 illustrates an image forming apparatus according to an exemplary embodiment of the present invention. In the following example, a multifunctional peripheral having the functions of a scanner, a printer, a photocopy machine, and a fax machine is described as the image forming apparatus. However, the image forming apparatus need not necessarily be a multifunctional peripheral, and may be any apparatus with a scanner function.

The image forming apparatus according to the exemplary embodiment includes an image forming apparatus main body 10 and an authentication camera 20. The image forming apparatus main body 10 includes a scanner mechanism 12, a printer mechanism 14, a controller 16, a display device 17, and an application processor 18. The scanner mechanism 12 optically reads (scans) a document image displayed on a medium such as paper and generates document image data. The printer mechanism 14 prints, for example, document image data obtained by the scan performed by the scanner mechanism 12 or print data input to the image forming apparatus via a network or the like on a medium. The controller 16 is a device that controls the operation of the image forming apparatus, and includes hardware such as a processor and memory and a program executed by the processor. In the exemplary embodiment, attention is particularly paid to control executed by the controller 16 for processing in the case where a paper document including personal information is read. The display device 17 is a device that displays a display screen for a user interface. The display device 17 may have the function of receiving a user input, as in a touchscreen, or may be configured only to display information. The application processor 18 executes application software for information processing on a document image read by the scanner mechanism 12. Information processing executed by the application processor 18 includes, for example, reception processing of receiving different notifications involving presentation of an identification document at government offices and financial institutions (however, this is only one example). Information processing executed by the application processor 18 may cooperate with other information processing systems (such as a system that records notification documents and a system that issues documents in accordance with notifications) connected via a network.

The authentication camera 20 is an image capturing device for capturing an image of the face of a person who presents a document including personal information (hereinafter referred to as a "personal information document") as article content, which is read by the image forming apparatus main body 10. In one example, the authentication camera 20 is included in the image forming apparatus main body 10. In another example, the authentication camera 20 may be installed at a counter for handling people who present documents, and may be wired or wirelessly connected to the image forming apparatus main body 10. Anyway, the authentication camera 20 is installed at a place where an image of the face of a person who presents a document to be scanned by the image forming apparatus main body 10 may be captured while the authentication camera 20 is connected to the image forming apparatus main body 10.

The image forming apparatus according to the exemplary embodiment scans a personal information document presented by a presenter, and then compares a face image included in the personal information document with an image of the face of the presenter captured with the authentication camera 20, thereby checking whether the personal information document describes the presenter's personal information or not. When it is confirmed that the personal information document is the presenter's, the image forming apparatus executes application processing on the scanned document image.

Figure 2:
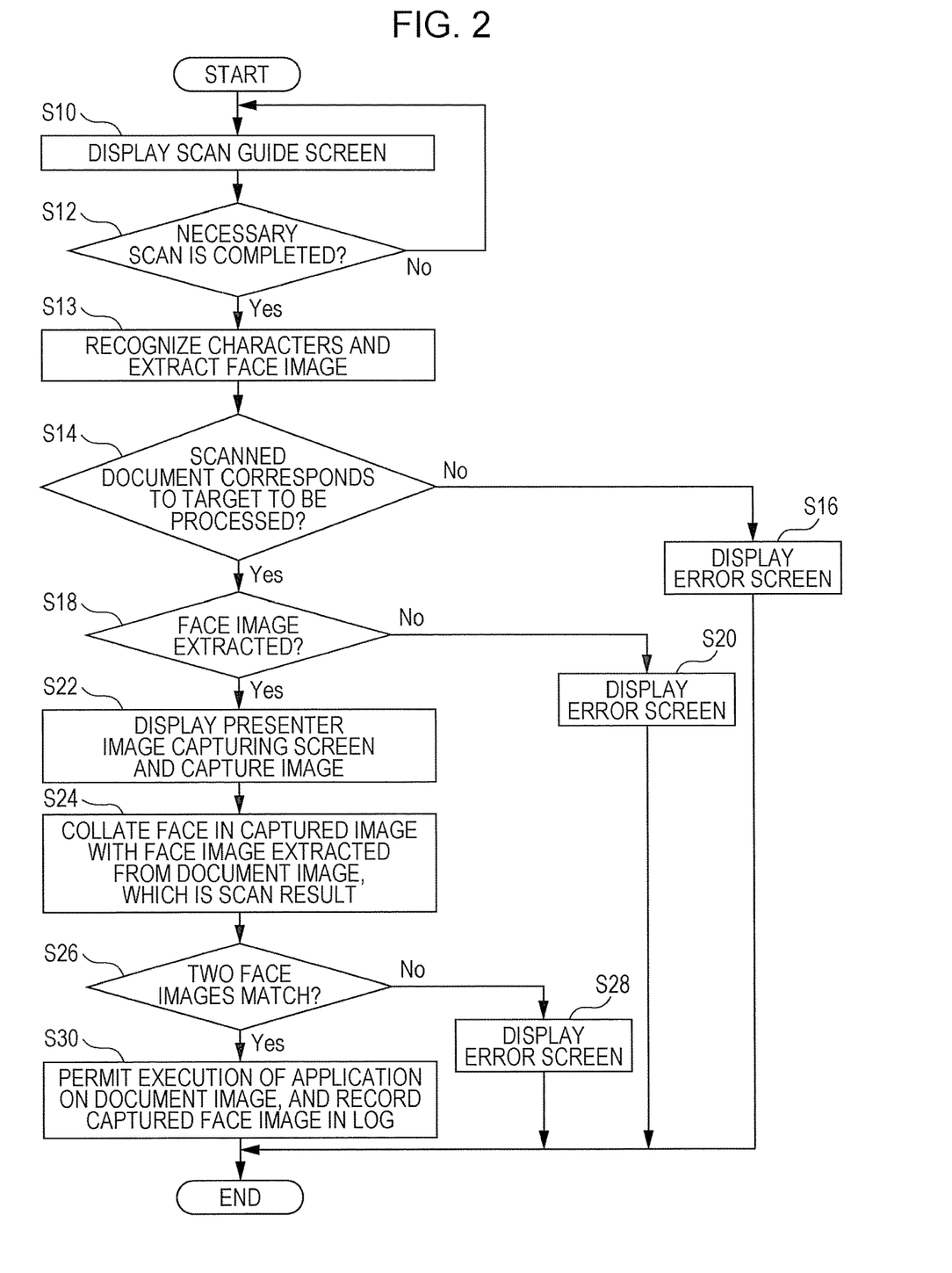
FIG. 2 is a flowchart illustrating the procedure of a process executed by a controller.

Referring now to FIG. 2, an example of the procedure of a process executed by the image forming apparatus according to the exemplary embodiment will be described. Hereinafter, the case will be described by way of example in which an operator who operates the image forming apparatus (such as counter staff at a government office) receives a personal information document presented by a presenter (such as a customer) and have the image forming apparatus read the document and perform processing.

Figure 3:
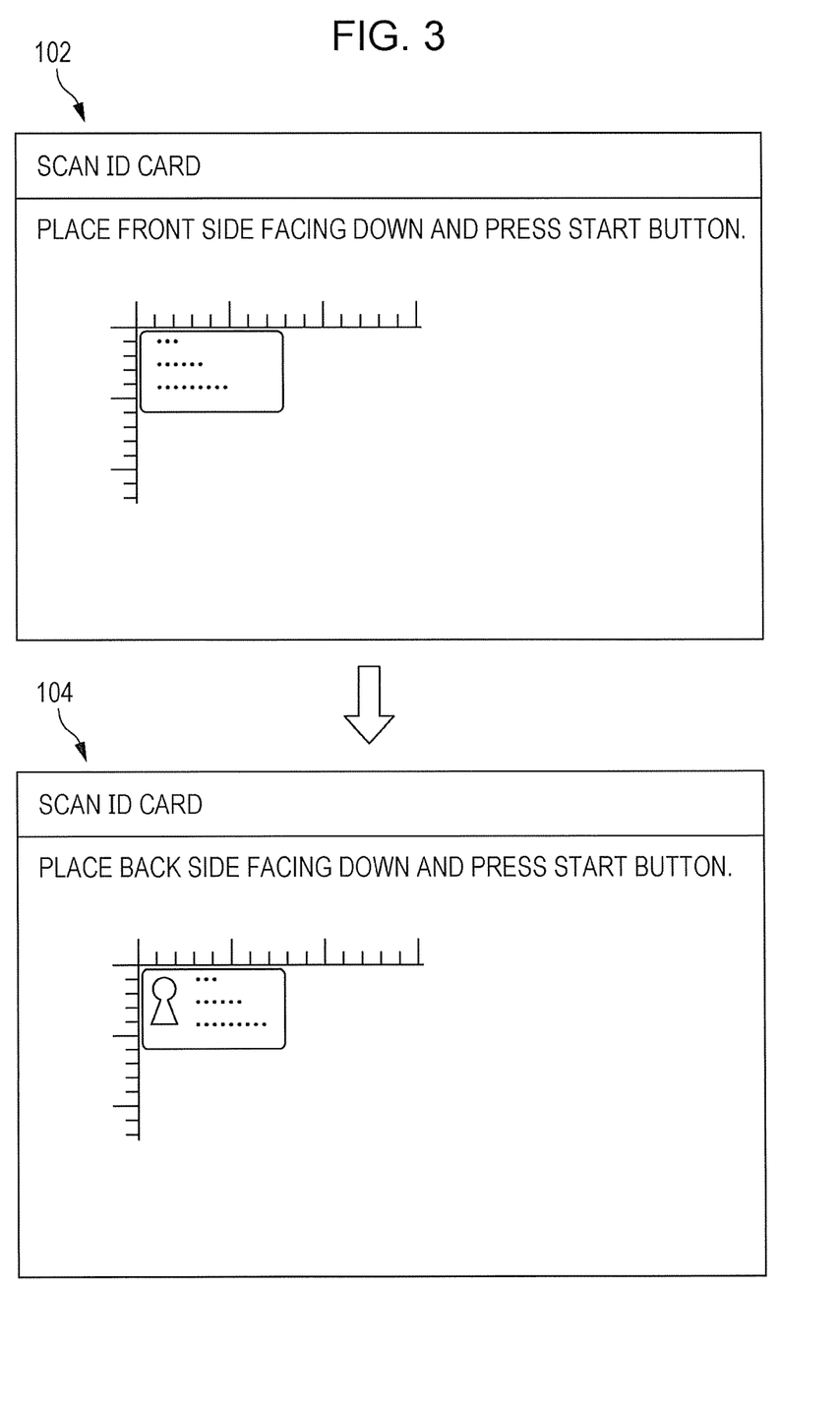
FIG. 3 is a diagram illustrating exemplary guide screens for a reading task.

In this procedure, when an instruction is given to execute a certain application, the controller 16 displays a guide screen that gives a guide to the method of scanning a document, which is a target to be processed by the application, on the display device 17. FIG. 3 illustrates exemplary guide screens. Guide screens 102 and 104 illustrated in FIG. 3 are used in an application for reading and processing the front and back sides of an identification (ID) card of the presenter's. In this example, the controller 16 first displays the guide screen 102, which guides the operator how to read the front side of the ID card, and the operator sets the front side of the ID card received from the presenter on a platen as indicated by the guide screen 102 and instructs the image forming apparatus to execute a scan.

After the scan, the controller 16 determines whether all the sides of the document necessary for the application have been scanned (S12). In the case of the example of the application which reads the two sides of the ID card illustrated in FIG. 3, because reading of the back side is also necessary, the determination result in step S12 is NO. Next, the controller 16 displays the guide screen 104 for scanning the back side of the ID card (S10), and executes a scan of the back side in accordance with an operation performed by the operator in accordance with the guide.

The controller 16 executes image feature extraction and analysis processing, such as optical character recognition (OCR) processing and face image extraction processing of the related art, on a document image on each side obtained by the scan (S13).

When the scan, OCR, and so forth of the necessary number of sides are completed, the controller 16 determines whether a document image on each side, generated by the scan, corresponds to the type of personal information document that is a target to be processed by the application (S14). In this determination, whether the document image has one or more features of a personal information document, which is a target to be processed by the application, is determined by performing feature extraction and analysis processing, such as OCR and face image extraction, in step S13, and, if it is determined that the document image has such features, the determination result in step S14 is YES. For example, in the case of an application that reads and processes an ID card, an attempt is made to read one or more features (such as marks and ruled lines in accordance with the format of the ID card, and the arrangement of strings) of the ID card from a document image which is the scan result, and, if such features are read, it is determined that the document image is of a document that is a target to be processed by the application.

Figure 4:
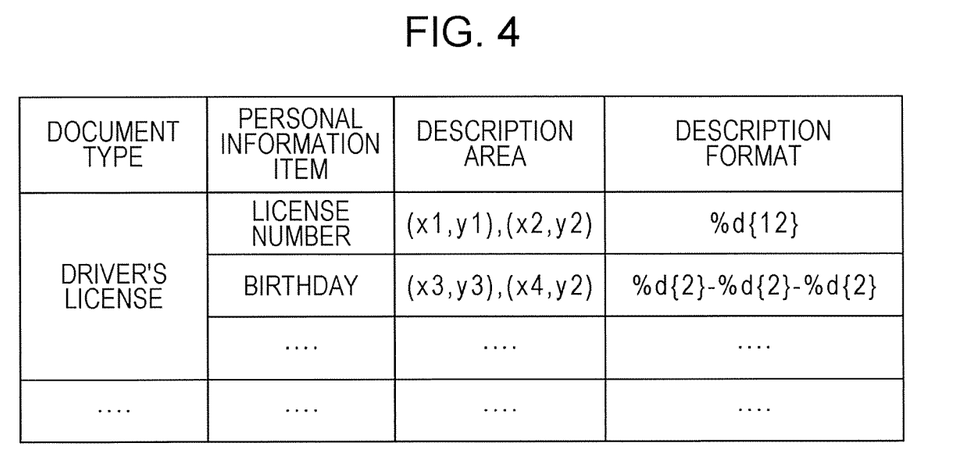
FIG. 4 is a diagram illustrating exemplary format information of a personal information document.

FIG. 4 illustrates exemplary format information of a personal information document usable in the determination in step S14. This is an example of format information of an ID card, which indicates, for each of personal information items such as an ID number and birthday described on the ID card, a description area (which is represented by a set of coordinates of the upper left and lower right vertices of a rectangular description area in the illustrated example) where the item is described within the plane of the ID card, and the format of a string of the item. For example, it is indicated that the ID number is represented by twelve digits, and the birthday is represented by an array of three numbers of four digits, two digits, and two digits indicating year, month, and day, respectively. If the size of a document image obtained by reading a document is the size of an ID card (not illustrated) and if the result of character recognition of the description area of each personal information item in the document image matches the string format of that item, it is confirmed that the document is an ID card, which is a target to be processed. A program that receives settings of format information of new types of personal information documents and information on the formats of strings corresponding to personal information may be installed in the controller 16 of the image forming apparatus.

Although the determination in step S14 is done after scanning images of the necessary number of sides in the illustrated example, the determination in step S14 may be done every time each side of a presented document is read.

If the determination result in step S14 is NO, it means that the scanned document is not a document to be processed (or the scanned document includes no personal information). In this case, the controller 16 displays an error screen on the display device 17 (S16), and ends the process. The error screen may be a screen that displays a message indicating that, for example, the read document is different from the type of document to be processed. Because the controller 16 prohibits the application processor 18 from executing processing on the scanned document image, the application is not executed, and processing on the document read this time ends.

Figure 5:
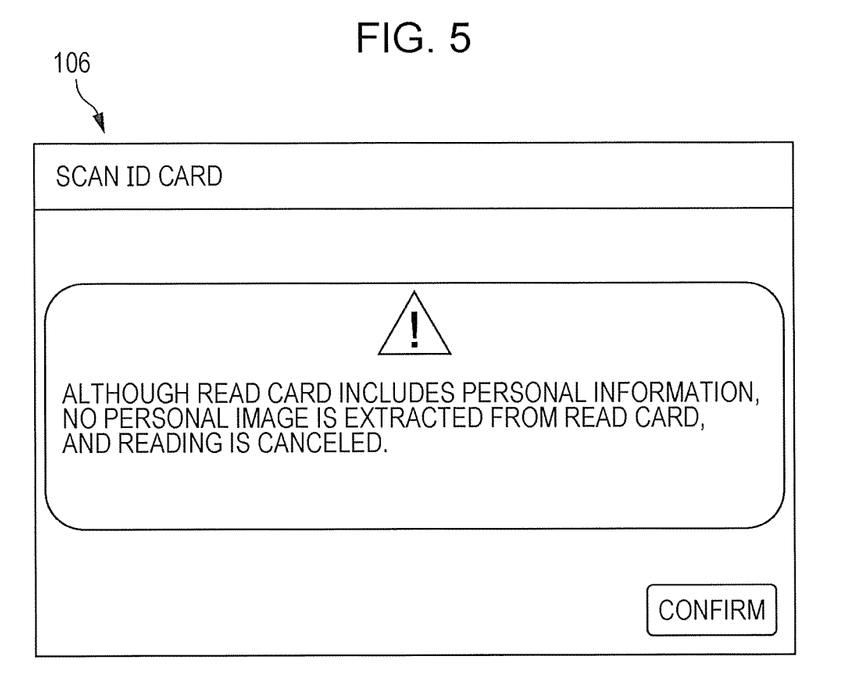
FIG. 5 is a diagram illustrating an exemplary error screen displayed if no face image is extracted from a document image.

If the determination result in step S14 is YES, the controller 16 determines whether a face image is extracted from the document image, which is the scan result (S18). This determination is performed on an image on a side that is supposed to have a face image, among images on the two sides of the document obtained by the scans (this is because a side that is supposed to have a face image is determined by the type of document, and this is determined when the application is determined). If the determination result in step S18 is NO, the controller 16 displays, on the display device 17, an error screen 106 displaying a message to stop the processing since no face image is extracted, as illustrated by way of example in FIG. 5 (S20). The controller 16 prohibits the application processor 18 from executing processing on the scanned document image, and ends processing on the read document.

Figure 6:
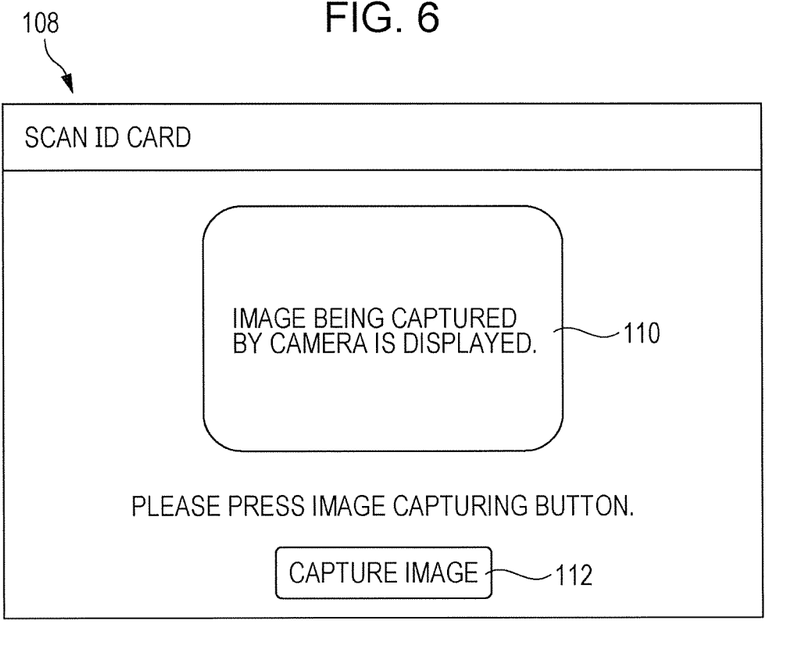
FIG. 6 is a diagram illustrating an exemplary face image capturing screen.

If the determination result in step S18 is YES (if a face image is extracted from the document image), the controller 16 displays a face image capturing screen 108 (see FIG. 6) for face collation on the display device 17. At the center of the face image capturing screen 108, an image display field 110 where an image currently being captured by the authentication camera 20 is displayed is provided. The operator of the image forming apparatus prompts the presenter of the personal information document to look at the authentication camera 20 in order to capture a face image, and, when the operator confirms that the presenter's face is appropriately displayed in the image display field 110 of the face image capturing screen 108, the operator presses an image capturing button 112 and gives an instruction to capture a still image of the presenter's face. Accordingly, the authentication camera 20 captures the current face image of the presenter, and the image is loaded into the controller 16 (step S22).

The controller 16 collates the face image extracted from the document image in step S13 with the presenter's face image captured in step S22 (S24), and determines whether the two images match, that is, the two images represent the same person's face, using a face image collation algorithm of the related art (S26).

Figure 7:
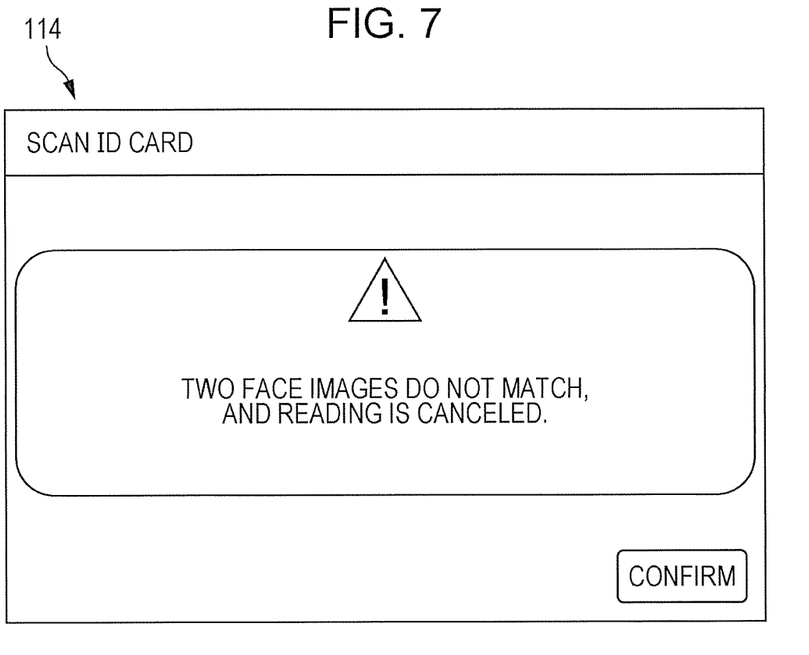
FIG. 7 is a diagram illustrating an exemplary error screen displayed if a face image in a document does not match a face image of a person captured with an authentication camera.

If this determination result is NO (mismatch), the controller 16 displays an error screen 114 indicating that the face images do not match, as illustrated by way of example in FIG. 7 (S28). At this stage, because the application processor 18 is prohibited from executing processing on the document image, processing on the document read this time ends.

Figure 8:
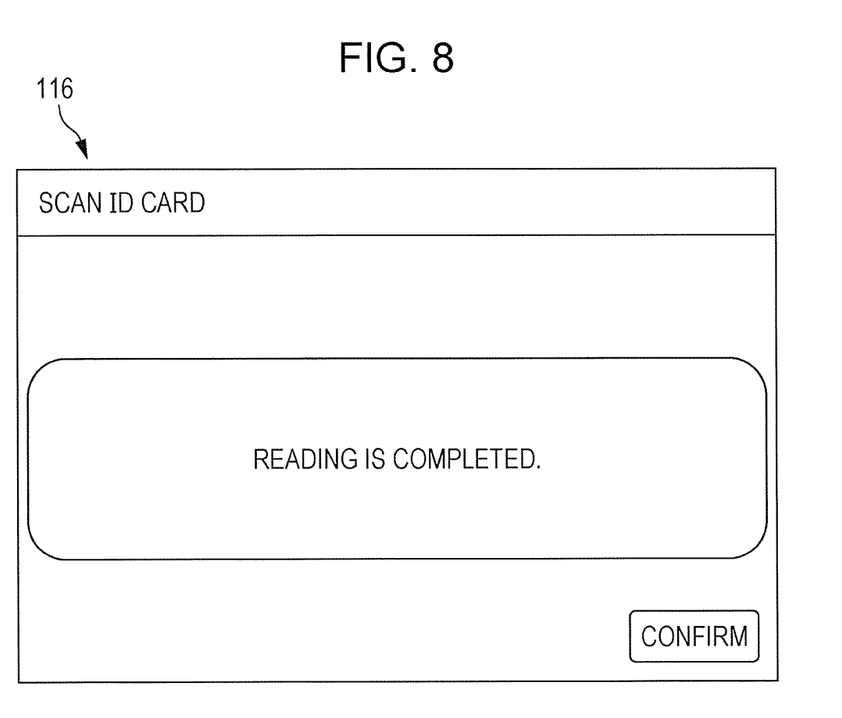
FIG. 8 is a diagram illustrating an exemplary screen displayed if the face images match and a process is normally executed.

If the determination result in step S26 is YES, the controller 16 displays, for example, a normal reading completion screen 116, illustrated by way of example in FIG. 8, on the display device 17, and permits the application processor 18 to execute processing on the document image, which is the scan result (S30). In response to this, the application processor 18 executes processing using the specified application on the document image. In this case, as an item of log data of processing executed by the image forming apparatus in response to the instruction given by the operator this time, identification information of the application being executed, and the presenter's face image captured in step S22 are recorded. The face image is referred to in order to audit execution of application processing or to investigate the cause of improper processing in the image forming apparatus when such cases occur. Whether to keep the captured face image of the presenter in the log data may be set by the administrator or the like on the image forming apparatus.

Although the controller 16 automatically performs control, on the basis of the determination in step S26, as to whether to permit the application processor 18 to execute processing on the document image in the procedure illustrated in FIG. 2, this is only one example. Alternatively, a screen displaying a message asking the operator for final confirmation by displaying the determination result in step S26 (whether the face images match or not) may be displayed on the display device 17, and the operator may give on the screen an instruction to permit or prohibit processing performed by the application processor 18. Although the case where the ID card itself is read has been described in the procedure illustrated in FIG. 2, this is only one example. Instead of reading the ID card itself, an A4-sized photocopy of the ID card may be read.

Figure 9:
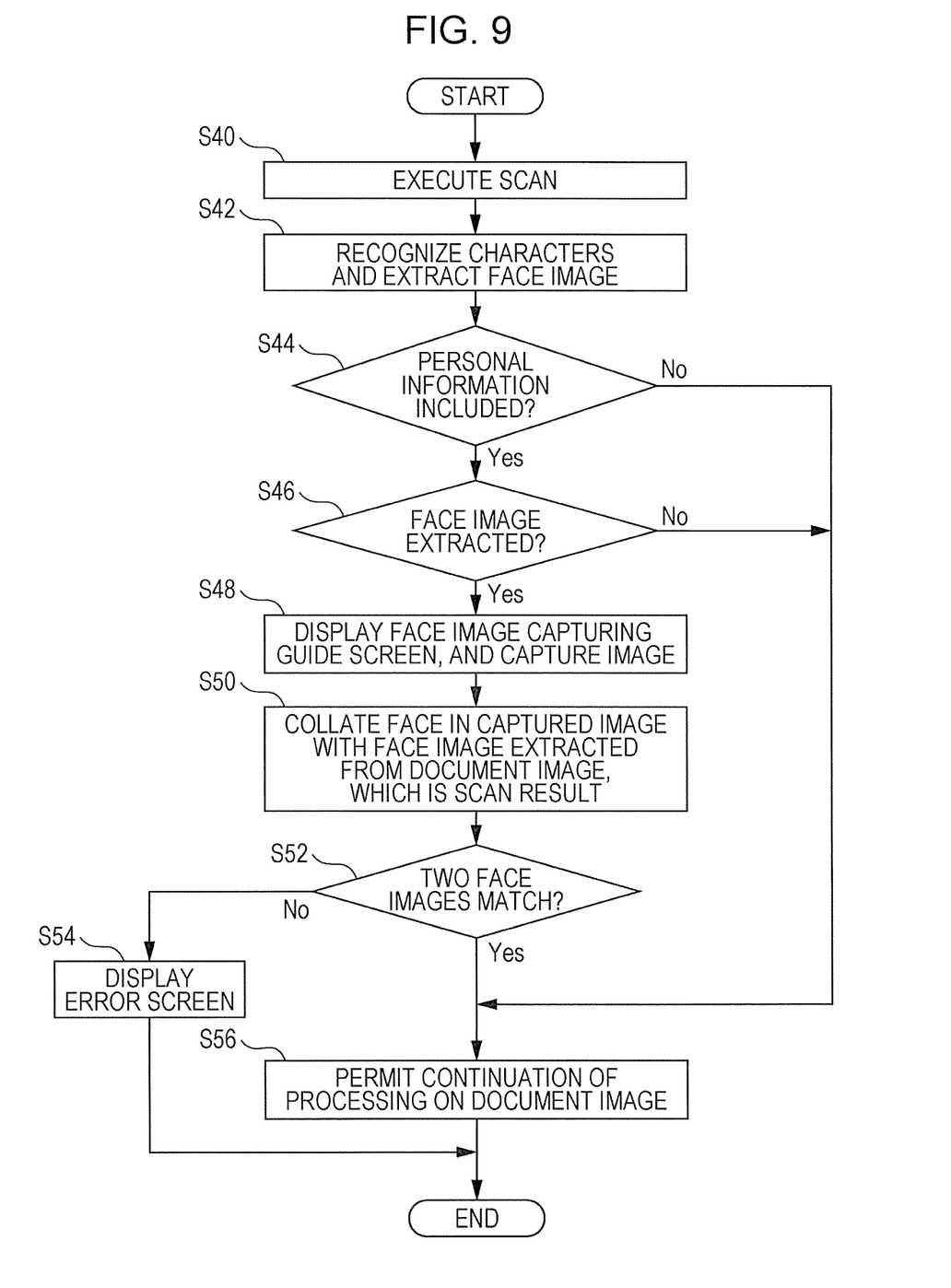
FIG. 9 is a diagram illustrating another example of the procedure of a process executed by the controller.

The procedure illustrated in FIG. 2 is a procedure in the case where a document scanned by the image forming apparatus is basically assumed to be a personal information document. In contrast, an example of the procedure of a process in the case where the image forming apparatus scans a document other than a personal information document will be described with reference to FIG. 9. In the procedure illustrated in FIG. 9, when the scanned document is a personal information document and includes a face image, execution of processing on the scanned image of the document is not allowed in response to an instruction given from those other than a person corresponding to the face image. The process illustrated in FIG. 9 is applied to, for example, an image processing apparatus located at a store such as a convenience store.

In this procedure, when a document is scanned by the scanner mechanism 12 in response to a user instruction (S40), the controller 16 executes image feature extraction and analysis processing, such as OCR processing and face image extraction processing, on a document image obtained by the scan (S42). The controller 16 determines whether the document image corresponds to a personal information document (S44). The processing in steps S42 and S44 may be the same as the processing in steps S13 and S14 of the procedure illustrated in FIG. 2. For example, in step S44, it is determined whether a string recognized by OCR and the position of the string match the format of any of personal information documents registered in the image forming apparatus, and, if the string and its position match the format of any personal information document, it is determined that the document is a personal information document.

If the determination result in step S44 is NO (if the document is not a personal information document), the controller 16 executes (continues) processing designated by the user on the document image (S56).

If the determination result in step S44 is YES, the controller 16 determines whether a face image is extracted from the document image (S46). When no face image is extracted, the controller 16 executes processing designated by the user, on the basis of the policy of giving priority to a user instruction if there is no material for determining whether the processing is permitted or not in this example (S56). Note that this is only one example, and the policy of prohibiting processing on a document image including personal information if no face image is extracted from the document image may be adopted.

If it is determined in step S46 that a face image is extracted, the controller 16 displays a face image capturing guide screen on the display device 17. On this screen, a message and a guide map for guiding the user to look at the authentication camera 20 provided in the image forming apparatus is displayed. When the user looks at the authentication camera 20 in accordance with the guide on the screen, the controller 16 issues an image capturing instruction, and extracts the user's face image from an image captured by the authentication camera 20 (S48).

The controller 16 collates the face image extracted from the document image in step S42 with the presenter's face image captured in step S48 (S50), and determines whether the two images represent the same person's face (S52).

If this determination result is NO, the controller 16 displays an error screen indicating that the processing is prohibited since the face images do not match (S54), and ends the series of processes.

If the determination result in step S52 is YES, the controller 16 displays a screen for permitting continuation of processing on the document image, which is the scan result, on the display device 17 (S56). In response to this, the application processor 18 executes processing of the application designated by the user on the document image. Additionally, in this example, the controller 16 may record the presenter's face image, captured in step S48, as an item of log data of this processing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a camera configured to capture an image of a face of a person;
   an image reading unit configured to read a document and to output a document image comprising a description area; and
   a controller configured to store a format information, wherein the format information comprises a predetermined size and a predetermined string format, the controller further configured to
   determine a plurality of characters in the description area of the document image and a size of the document image,
   determine whether the size of the document image matches the predetermined size and a format of the plurality of characters in the description area of the document image matches the predetermined string format,
   collate the image of the face captured by the camera with a face image extracted from the document image, and
   perform control to permit certain processing on the document image when the size of the document image matches the predetermined size, the format of the plurality of characters in the description area of the document image matches the predetermined string format, and the image of the face captured by the camera matches the face image extracted from the document.

2. The image processing apparatus according to claim 1, wherein the controller is configured to perform control to prohibit execution of the certain processing on the document image if no face image is extracted from the document image.

3. The image processing apparatus according to claim 1, wherein the controller issues a notification to an operator if the document image includes no personal information.

4. The image processing apparatus according to claim 1, wherein, in a case where the document image includes personal information and the face image, when the image of the face captured by the camera and the face image included in the document match, the controller performs control to permit certain processing on the document image.

5. The image processing apparatus according to claim 1, wherein the controller performs control to prohibit execution of the certain processing on the document image when the image of the face captured by the camera and the face image extracted from the document do not match.

6. The image processing apparatus according to claim 1, further comprising:
   a recording unit configured to record the image of the face captured by the camera as an item of log information regarding execution of the certain processing if the certain processing is permitted.

7. A non-transitory computer readable medium storing a program causing a computer to execute a process, the process comprising:
   capturing an image of a face of a person;
   reading a document and outputting a document image comprising a description area;
   storing a format information, wherein the format information comprises a predetermined size and a predetermined string format;
   determining a plurality of characters in the description area of the document image and a size of the document image;
   determining whether the size of the document image matches the predetermined size and a format of the plurality of characters in the description area of the document image matches the predetermined string format;
   collating the captured image of the face with a face image extracted from the document image; and
   performing control to permit certain processing on the document image when the size of the document image matches the predetermined size, the format of the plurality of characters in the description area of the document image matches the predetermined string format, and the captured image of the face matches the face image extracted from the document.

* * * * *